United States Patent [19]

Nakata

[11] 3,996,081
[45] Dec. 7, 1976

[54] METHOD FOR MAKING A HIGH VOLTAGE CABLE SPLICE

[75] Inventor: Roy Nakata, Pittsfield, Mass.

[73] Assignee: General Electric Company, Philadelphia, Pa.

[22] Filed: Feb. 10, 1976

[21] Appl. No.: 657,005

Related U.S. Application Data

[63] Continuation-in-part of Ser. No. 509,504, Sept. 29, 1974, Pat. No. 3,951,712.

[52] U.S. Cl. .................................. 156/48; 156/49; 174/84 R
[51] Int. Cl.² ...................................... H01B 13/00
[58] Field of Search ............... 156/48, 49, 51, 276; 264/272, 86; 174/76, 84 R, 84 C

[56] References Cited

UNITED STATES PATENTS

| | | | |
|---|---|---|---|
| 1,835,922 | 12/1931 | Zeiss et al. | 156/48 |
| 3,951,712 | 4/1976 | Nakata | 156/49 X |

Primary Examiner—David A. Simmons
Attorney, Agent, or Firm—William Freedman

[57] ABSTRACT

In this method, a pre-formed insulating sleeve is placed about the adjacent ends of the two sections of high voltage cable that are to be joined. At opposite ends of the sleeve in locations between the sleeve and the original cable insulation, two rings of porous material are provided. Into the space between the sleeve and the surrounded cable portion, there is pumped a slurry containing suspended particles of insulating material. The liquid component of the slurry is allowed to discharge from said space via the pores in said rings, but the particles of insulating material are filtered out so as to build up a deposit of said particles from the internal surfaces of said rings. This pumping and filtering action is continued until the deposit fills the space between the sleeve and the surrounded cable portion.

11 Claims, 2 Drawing Figures

METHOD FOR MAKING A HIGH VOLTAGE CABLE SPLICE

CROSS REFERENCE TO RELATED APPLICATION

This application is a continuation-in-part of my copending application Ser. No. 509,504, filed Sept. 29, 1974, now U.S. Pat. No. 3,951,712 and assigned to the assignee of the present invention, which application is incorporated by reference in the present application.

BACKGROUND

This invention relates to a method of making a splice between two sections of high voltage cable and, more particularly, relates to a method of this type wherein a slip-on sleeve primarily of insulating material is positioned about the ends of the two cable sections and the space between the sleeve and the ends is filled with insulating material.

A problem that has been involved in making cable splices in this manner is that it has been difficult to consistently provide insulation of the necessary high dielectric strength in the space between the slip-on sleeve and the ends of the cable sections. A major difficulty has been in providing, in the highly stressed regions of this splice, insulation that precisely conforms with the original cable insulation and with the inner surface of the sleeve so as to eliminate at these interfaces objectionable voids that can be sources of dielectric weakness.

SUMMARY

An object of my invention is to apply insulation in the above-described regions in such a way that there is a reduced likelihood of voids at the interfaces compared to that resulting from most prior methods of applying such insulation.

Another object is to apply such insulation by a method which utilizes the principles disclosed in my aforesaid application Ser. No. 509,504.

In carrying out the invention in one form, I place a pre-formed insulating sleeve about the adjacent ends of the two sections of high voltage cable that are to be joined together. The sleeve includes a tubular conductive shield adjacent its inner periphery for voltage grading purposes, and this shield I conductively connect to the cable conductor. At one end of the sleeve in a location between the sleeve and the original insulation of the cable, I provide a ring of porous material. Into the space between the sleeve and the surrounded cable portion, I pump a slurry comprising a liquid and insulating particles suspended therein. The liquid component of the slurry is allowed to discharge from said space via the pores in the ring but said particles are filtered out within said space to build up from the internal surface of the ring a deposit of said particles. The discharge of slurry from said space is sufficiently blocked to develop within said space pressures substantially exceeding those downstream from the ring. The pumping and filtering action is continued until the deposit spans the space between the sleeve and the surrounded cable portion.

BRIEF DESCRIPTION OF DRAWINGS

For a better understanding of the invention, reference may be had to the accompanying drawings, wherein.

DETAILED DESCRIPTION OF THE PREFERRED EMBODIMENT

Figure 1:
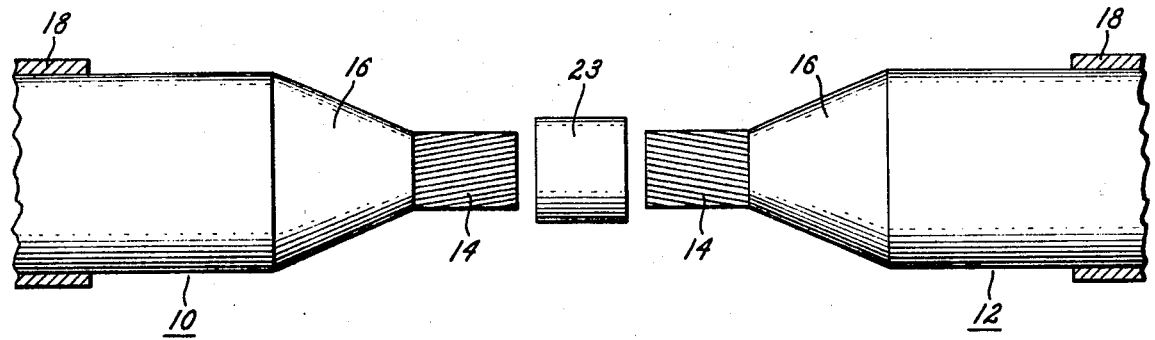
FIG. 1 is a partially sectional view showing two cable sections that are to be joined together by a splice formed in accordance with one form of my invention.

Referring now to FIG. 1, two cable sections that are to be joined together are designated 10 and 12. Since these cable sections are substantially identical, identical reference numerals are used for corresponding parts of each. Each cable section comprises a conductor section 14, insulation 16 surrounding the conductor section, and a tubular metal sheath 18 surrounding the insulation 16. Sheath 18 can be either of sheet, taped or braided construction. Each cable section, as seen in FIG. 1, has been prepared for formation of the splice by removal of insulation 16 from its end to provide an exposed end portion of the conductor section and by removal of some of the metal sheath 18 to provide exposed insulation 16 projecting past the end of the metal sheath. The end of insulation 16 is preferably formed into a tapered configuration, as illustrated in FIG. 1. In one embodiment of the invention insulation 16 is of oil-impregnated paper.

The ends of conductor sections 14 of the two cable sections are first brought together, and, in a conventional manner, a tubular metal coupling 23 in the form of a sleeve, is clamped or brazed about the exposed ends to form a good electrical and mechanical joint therebetween, thus forming a completed conductor 14, 23.

After the cable sections have thus been joined, a pre-formed cylindrical sleeve 20, primarily of electrical insulation, is slipped axially along one of the cable sections and into a position where it surrounds the conductor 14, 23 and the tapered ends of the original insulation 16. The slip-on sleeve 20 can be of a conventional construction but preferably comprises voltage-grading means imbedded in the insulating material of the sleeve. This voltage-grading means comprises a plurality of concentrically-disposed tubular metallic shields 24, 26 and 28 each imbedded in the insulation of the sleeve. The inner shield 24 is electrically connected to the conductor 23, 14 by means of a metal contact finger 29 fixed to the inner shield 24 and having its inner end engaging sleeve 23. This conductive connection provided by finger 29 places the inner shield 24 at the same potential as the conductor 23, 14 and acts to transfer the highest electrical stresses to the insulating material of sleeve 20 in the region immediately adjacent the shield 24.

The outer surface of sleeve 20 comprises a metal coating 30 that is electrically connected to ground. Full line-to-ground voltage is present between inner sleeve 24 and the grounded coating 30, and the intermediate shields 26 and 28 act to appropriately distribute this voltage within the insulation between parts 24 and 30.

At opposite ends of the sleeve 20 I provide two annular metal rings 35, each having a generally L-shaped cross-section. The vertically-extending annular leg of each L-shaped ring 35 is suitably attached, as by brazing, to the metal outer coating 30 of sleeve 20. The other leg, which is of cylinderical configuration, is clamped about the cylindrical portion of the exposed original cable insulation by means of a split clamp 37. Clamp 37 also embraces the grounded metal sheath 18 of the cable section and thus forms a good electrical connection between ring 35 and sheath 18. In a preferred form of the invention, each ring 35 is of a porous construction for reasons soon to be explained.

Although the region of highest electric stress is located within the insulating body of sleeve 20, the regions between each end of the shield 24 and the adjacent ring 35 are also under substantial electrical stress, especially in the location at the inner periphery of the sleeve 20. To prevent a dielectric breakdown from being initiated in this region, it is important that the space between sleeve 20 and the original insulation 16 in this region be filled with high quality insulation that is substantially free of voids.

I provide such insulation by using an insulationapplying method that employs the principles disclosed in my above-noted copending application Ser. No. 509,504. More specifically, I pump into the space 40 between the sleeve 20 and the surrounded portion of the original cable a slurry 42 comprising a liquid and particles of electrical insulation suspended in the liquid. This slurry enters space 40 through a feed tube 45 extending through one of the rings 35, and the liquid component thereof discharges from space 40 through the pores in the porous rings 35, as shown at 43 in FIG. 2. This liquid component follows flow paths through the space 40 such as illustrated by arrows 47. The suspended particles are trapped or filtered out within the space 40. Initially the suspended particles are filtered out by the porous walls of the ring 35, thus building up an initial deposit 49 on the inside surface of these rings. After this initial deposit of progressively increasing thickness, as considered in a direction extending away from the porous wall.

This pumping and filtering action is continued until the entire space 40 is filled with the above-described deposit of insulating material. The portion of the deposit that is located in the axially-central region of space 40, i.e., in axial alignment with the exposed portion of conductor 14, 23, has a somewhat lower density than that located at the axially outer ends of the space. But this lower density in the central region is not objectionable because this is a region of very low electrical stress inasmuch as it is located between parts (24 and 23, 14) at the same potential. In the higher stress regions at the opposite ends of the space 40, the density of the deposit is substantially higher than in the central region. This is advantageous since the higher density results in a higher dielectric strength in the regions where most needed, i.e., in the regions of high electric stress.

It is to be understood that soon after pumping begins, the space 40 fills with slurry and, during the entire remaining portion of the insulation-applying process, remains filled with slurry and the material deposited therefrom. After the initial deposit is trapped on the internal wall of the rings 35, the pressure in the space 40 rises to and remains in a relatively high range that serves the important purpose of compacting or densifying the deposited material, e.g., 49, and forcing it to closely conform to the substrate on which it is deposited so as to provide for increased dielectric strength in the final splice. By way of example, a typical pressure that is developed and maintained in the space 40 during deposition of the insulation is around 50 p.s.i.g. with repetitive superimposed pulses (soon to be described) carrying the pressure up to peaks of around 200 p.s.i.g.

Since the space 40 remains filled during the entire insulation-applying process with the pumped-in slurry and the solid material deposited therefrom, all under pressure, it will be apparent that air from the surrounding ambient is largely excluded from the insulation, thus further reducing the likelihood of voids in the applied insulation. Also, the air that was originally present in the space 40 is swept out at an early stage by the slurry components flowing therethrough. If desired, the slurry can be suitably deaerated by conventional techniques to even further exclude entrapped air.

In one embodiment of my invention, the liquid component of the slurry is the usual oil used for insulating purposes in electric cables that have paper-oil insulation, and the suspended particles in the slurry are of a cellulosic material such as used for paper. The particles can be in the form of fibres, or flakelets, or even generally spherical bits. Moreover, the particle form can be varied as the filling operation proceeds.

Along the interface between the original insulation 16 and the deposited insulation 49, a high dielectric strength is maintained because of the high degree of conformity of the deposited insulation on the original insulation resulting from the compacting of the applied insulation thereagainst by the hydraulic pressure present during formation.

There are many types of insulating material suitable for the suspended particles. Two additional examples are fibres of poly (diphenylphenylene oxide) resin and poly dimethylphenylene oxide) resin. High quality insulating can be applied using a slurry of these types of fibres suspended in cable oil.

Although I prefer to use oil as the liquid component of the slurry for the typical oil-paper high voltage cable, other liquids can instead by used, e.g., a silicone dielectric fluid such as that sold by Dow-Corning Corp. as its Dow-Corning 200 dielectric fluid.

In still another embodiment of our invention, the liquid in the slurry is an uncured thermosetting resin containing the suspended particles. Pumping and filtering proceeds as above described to fill the space 40, after which any resin left behind in the space 40 is cured by suitable polymerization techniques, such as heating the splice. An example of such a slurry system is one containing uncured epoxy resin as the liquid component and flakelets of mica as the solid component. Other suitable solids, either organic or inorganic, may be used in addition to or in place of the mica, e.g., cellulosic material or silica.

It has been found that greater and more uniform density can be achieved in the insulation by applying added pressure to the slurry in repetitive pulses. These pulses are effective in compacting the deposited insulation and have less tendency to damage the original insulation 16 of the cable than does a steady high pressure. The previously-described radial compression of the original cable insulation 16 by the clamps 37 serves to further protect this cable insulation 16 by confining the pressure surges to the region between the clamps and preventing any substantial portion of them from being transmitted into the original cable insulation outside the region between the clamps.

Further details as to materials for use in the slurry and as to apparatus for supplying and pressurizing the slurry are contained in my aforesaid application Ser. No. 509,504.

Figure 2:
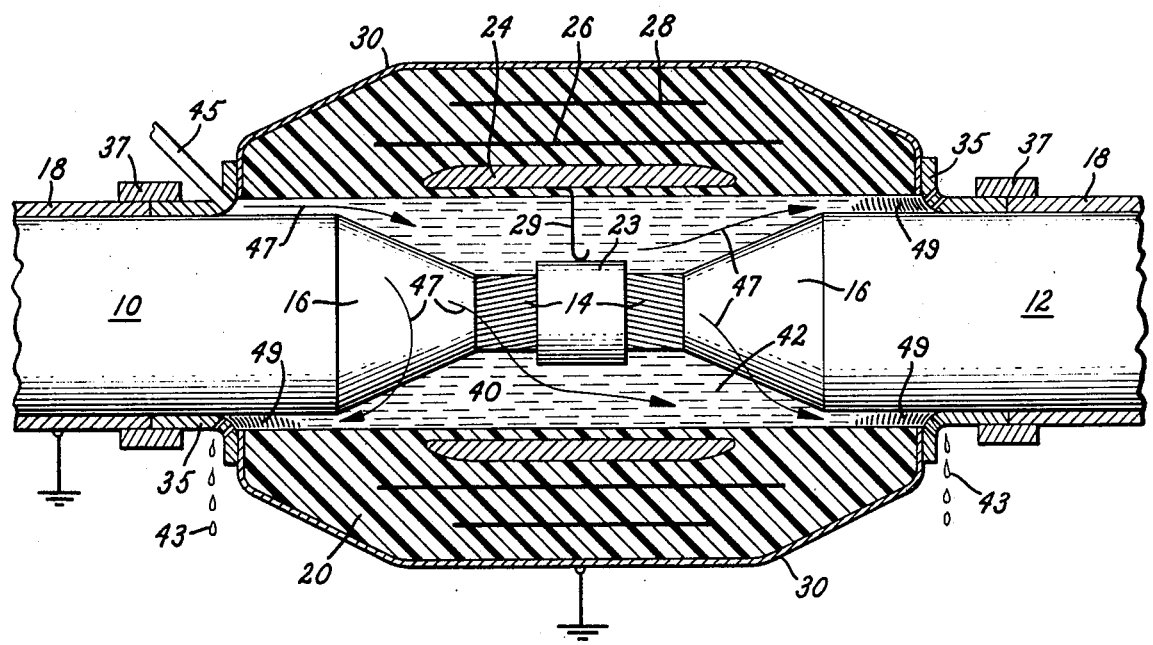
FIG. 2 is a sectional view showing a method embodying one form of my invention. The method is depicted at an intermediate stage in the application of insulation to the splice.

While I much prefer to provide porous rings (35) at both ends of the sleeve (20), as shown in FIG. 2, it is to be understood that my invention in its broader aspects comprehends the use of a porous ring at only one end. In such an embodiment, the slurry is preferably fed into space 40 from the opposite end of sleeve 20 through a plurality of tubes such as 45 supported by a suitable non-porous ring and circumferentially-spaced around the cable section 10.

While I have shown and described a particular embodiment of my invention, it will be obvious to those skilled in the art that various changes and modifications may be made without departing from the invention in its broader aspects; and I, therefore, intend in the appended claims to cover all such changes and modifications as fall within the true spirit and scope of my invention.

What I claim as new and desire to secure by Letters Patent of the United States is:

1. A method of making a splice between two sections of high voltage cable, each comprising: a conductor section and original electrical insulation surrounding said conductor section, the conductor section having an exposed end extending beyond the end of said original insulator, said method comprising:
   a. electrically and mechanically joining the exposed ends of said conductor sections to form a conductor,
   b. providing about said conductor and the ends of said original insulation a sleeve primarily of insulating material spaced from and surrounding the conductor and said ends, said sleeve including voltage grading means comprising a tubular conductive shield adjacent the inner periphery of the sleeve,
   c. providing conductive means extending between said shield and said conductor for electrically connecting said shield to said conductor,
   d. providing at one end of said sleeve in a location between said original insulation and said sleeve a ring of porous material,
   e. pumping into the space between said sleeve and the cable portion surrounded by said sleeve a slurry comprising a liquid and particles suspended in said liquid having good electrical insulating properties,
   f. allowing the liquid component of said slurry to discharge from said space via the pores in said ring but filtering out said particles within said space so as to build up from the internal surface of said ring a deposit of said particles,
   g. blocking discharge of the components of said slurry from said space sufficiently to develop within said space pressures substantially exceeding those downstream from said ring,
   h. continuing said pumping and filtering action and thereby continuing the build-up of said deposit until the deposit spans said space between the internal wall of said sleeve and the cable portion surrounded thereby.

2. The method of claim 1 in which said pumping and filtering action is continued until the space between said sleeve and the cable portion surrounded thereby is substantially filled with said deposit.

3. The method of claim 1 in which:
   a. a second porous ring is provided at an opposite end of said sleeve from the first ring in a location between said original insulation and said sleeve, and
   b. The liquid component of said slurry is allowed to discharge from said space via the pores in said second ring but said particles are filtered out within said space so as to build up from the internal surface of said second ring a deposit of said particles.

4. The method of claim 3 in which at least part of the slurry entering said space is introduced into said space via an opening in one of said rings.

5. The method of claim 1 in which said liquid component is an oil with good electrical insulating properties and said particles are of cellulosic material.

6. The method of claim 1 in which said liquid component is an oil with good electrical insulating properties and said particles are of a resin.

7. The method of claim 1 in which:
   a. the liquid component of the slurry entering said housing is a resin in an uncured state and
   b. the resin remaining in such housing is cured after said deposit has built up therein.

8. The method of claim 1 in which:
   a. said original insulation is paper-oil, and
   b. said liquid component is oil and said particles are of cellulosic material.

9. The method of claim 1 in which:
   a. said original insulation is paper-oil,
   b. said liquid component is oil and said particles are of a resin.

10. The method of claim 1 in which pressure within said space during the build-up of said deposit is applied in repetitive pulses.

11. The method of claim 1 in which said voltage grading means comprises one or more additional conductive shields of tubular configuration imbedded in the insulating material of said sleeve and surrounding in generally concentric relationship the shield that is located adjacent the inner periphery of said sleeve.

* * * * *